Dec. 1, 1931.       R. S. WHALEY       1,834,754
GEAR PUMP
Filed July 9, 1930
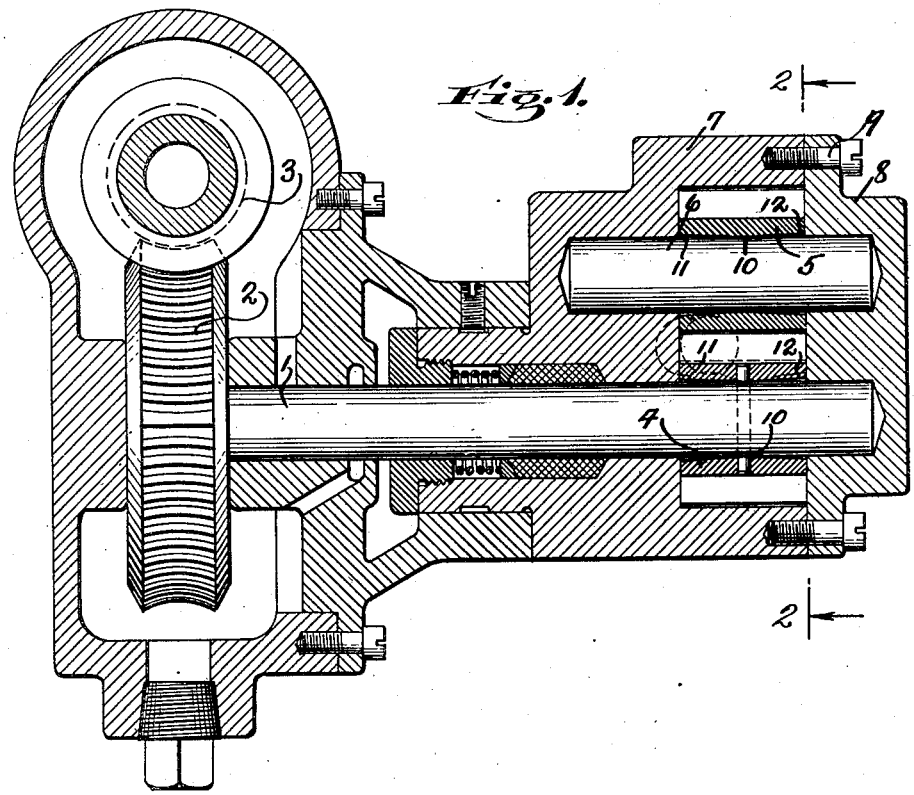
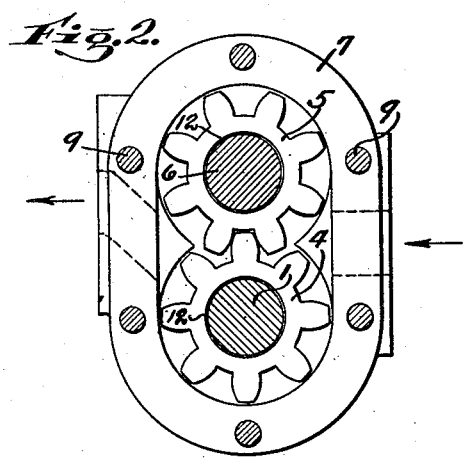
INVENTOR.
Ralph S. Whaley.
BY
Kiddle, Margeson and Donidge.
ATTORNEYS.

Patented Dec. 1, 1931

1,834,754

UNITED STATES PATENT OFFICE

RALPH S. WHALEY, OF SEATTLE, WASHINGTON, ASSIGNOR TO PETROLEUM HEAT AND POWER COMPANY, OF NEW YORK, N. Y., A CORPORATION OF DELAWARE

GEAR PUMP

Application filed July 9, 1930. Serial No. 466,649.

My invention relates to an improvement in gear pumps which for purposes of illustration I have shown as applied to oil burning apparatus for supplying oil to the burner nozzle.

In gear pumps as heretofore constructed extreme care must be taken in shaping the teeth of the gears and in fabricating the pump casing in order that the gears will mesh properly at all times and in order that there may be no leakage between the faces of the gear and the gear casing in order that the pumps may be efficient, all of which greatly adds to the expense of manufacture and by the same token any wear either in the gears or their casing reduces the efficiency of the pump.

The present invention provides a construction in which the accuracy of manufacture above referred to is considerably reduced and the efficiency of the pump will be maintained indefinitely.

In the drawings accompanying this application wherein I have shown an embodiment of my invention:

Fig. 1 is a sectional elevational view of a gear pump constructed in accordance with this invention, showing the same as applied to an oil burner; and Fig. 2 is a section on the line 2—2 of Fig. 1.

Referring to the drawings in detail: 1 designates the pump drive shaft mounted in suitable bearings and provided at one end with a worm gear 2 driven from a worm 3 whereby rotation is imparted to the shaft. Mounted on this shaft so as to be driven thereby is a drive pump gear 4, and in mesh with this drive gear is a driven pump gear 5, this latter gear being mounted for rotation on a short shaft 6.

7 designates one section of the housing enclosing the two gears 4 and 5, while 8 designates a cap constituting the other section of the housing, this cap being held to the section 7 by screws 9. If desired this construction can be changed without invention by employing a filter section between the part 7 and cap 8. In order that the teeth of the two gears 4 and 5 may always mesh properly with each other even though these teeth may not be cut or formed with maximum accuracy and in order that the faces of the gears may fit the gear housing at all times so as to prevent leakage between the gear faces and the housing the gears 4 and 5 are each provided with a double tapered bore, the bore of each gear being smaller in diameter at the center as shown at 10 than at the ends 11 and 12. This double taper is much exaggerated in the drawings, actually being very slight, just sufficient to permit the gears to rock slightly, whereby any inaccuracy so far as the gear teeth are concerned or the fit of the gears in their housing will be automatically compensated for.

My invention, therefore, provides a construction in which the gears are allowed to rock or tilt slightly on their respective supporting shaft whereby inaccuracies either in the forming of the gear teeth or the fit of the gears in their housing will be compensated for automatically.

What I claim is:—

1. A gear pump comprising a pair of intermeshing gears, a shaft for each gear, one of said gears having a double tapered bore for its shaft to permit of rocking or tilting of the gear on its shaft.

2. A gear pump comprising a driver gear, an intermeshing idler or driven gear, a housing for said gears, a shaft within the housing for supporting the driven gear, a shaft extending through the housing for supporting the driver gear, each of said gears having a double tapered bore for the reception of its supporting shaft to permit of rocking or tilting of the gears on their respective shafts.

This specification signed this 1st day of July, 1930.

RALPH S. WHALEY.